US00RE42595E

(19) United States
(12) Reissued Patent
Chen et al.

(10) Patent Number: US RE42,595 E
(45) Date of Reissued Patent: Aug. 2, 2011

(54) COMMAND CONVERSION INTERFACE BETWEEN IMAGE PROVIDER AND IMAGE REQUESTOR

(75) Inventors: Jack Chen, Hsinchu (TW); Jewel Tsai, Hsinchu (TW); Nora Wen, Hsinchu (TW)

(73) Assignee: Transpacific Optics LLC, Wilmington, DE (US)

(21) Appl. No.: 11/961,980

(22) Filed: Dec. 20, 2007

Related U.S. Patent Documents

Reissue of:
(64) Patent No.: 6,978,449
Issued: Dec. 20, 2005
Appl. No.: 09/860,644
Filed: May 21, 2001

(51) Int. Cl.
*G06F 9/45* (2006.01)

(52) U.S. Cl. ..... 717/136

(58) Field of Classification Search ..... 717/136, 717/140; 463/36–37; 358/3.23, 3.24
See application file for complete search history.

(56) References Cited

U.S. PATENT DOCUMENTS 4,980,842 A * 12/1990 Kamada et al. ..... 710/1
5,378,915 A * 1/1995 Hines et al. ..... 250/369
5,485,283 A * 1/1996 Kaneko ..... 358/518
5,543,897 A 8/1996 Altrieth, III
5,661,576 A * 8/1997 Kaneko ..... 358/539
6,232,735 B1 * 5/2001 Baba et al. ..... 318/567
6,331,146 B1 * 12/2001 Miyamoto et al. ..... 463/32
6,350,382 B1 2/2002 Schick
6,385,412 B1 5/2002 Sadakuni
6,590,593 B1 7/2003 Robertson et al.
6,978,449 B2 12/2005 Chen et al.
7,016,069 B2 * 3/2006 Hanagami et al. ..... 358/1.2

OTHER PUBLICATIONS

Mustek System Inc., "Scanner User's Guide", Mustek System Inc., http://www.mustek.com/Class/pdf/1200scanner-.pdf, Jan. 1999, 28 pages.
Mustek System Inc., "VDC-300 User's Manual", Mustek System Inc., http://www.mustek.com/Class/pdf/vdc300.pdf, Jul. 1998, 43 pages.
Mustek System Inc, "VDC-300 User'Manual", Mustek System Inc., http://www.mustek.com/Class/pdf/vdc300.pdf, Jul. 1998.*

* cited by examiner

*Primary Examiner* — Anna Deng
(74) *Attorney, Agent, or Firm* — Perkins Coie LLP

(57) ABSTRACT

A command conversion interface between an image machine with a plurality of hard keys and an image requestor is disclosed. When the command conversion interface detects and determines the activation of a specific hard key of the image machine, digital image information from the image machine is provided for the image requestor through the command conversion interface to execute a designated task, which has not been built in the image machine. In the command conversion interface, the designated task is interpreted by a destination command script, and the destination command script is processed by a compiler along with the digital image information, then transmitted to the image requestor to execute the task. The relationship between the specific hard key and the designated task refers to a new correlation table of the command conversion interface.

35 Claims, 2 Drawing Sheets

COMMAND CONVERSION INTERFACE BETWEEN IMAGE PROVIDER AND IMAGE REQUESTOR

Matter enclosed in heavy brackets [ ] appears in the original patent but forms no part of this reissue specification; matter printed in italics indicates the additions made by reissue.

*CROSS-REFERENCE TO RELATED APPLICATION*

*This patent application is a reissue application for commonly assigned U.S. Pat. No. 6,978,449, issued from U.S. patent application Ser. No. 09/860,644, filed on May 21, 2001.*

FIELD OF THE INVENTION

The present invention relates to a command conversion interface, and more particularly to a command conversion interface between a provider and a requester of package information such as image.

BACKGROUND OF THE INVENTION

With the rapid development of information industrial products, e.g. personal computers, a diverse group of peripheral equipment and information processing devices are created. For example, image scanners and digital cameras become more and more popular and advanced, and are expected to be essential to our daily lives some day.

As known to those who are familiar with computers, the peripheral equipment of computers should properly work with corresponding application programs to exhibit the greatest performance. Unfortunately, so far, the peripheral equipment hardware and application program software have been produced by different engineers of different fields. For example, a software engineer does not understand well about the design of the hardware device, so the considerations may be confined when he develops the corresponding software. As results, the hardware device cannot be manipulated as smooth as desired. Therefore, if the hardware-related information can be provided for the software engineer as package information to be directly applied to the application programs, the performance of the hardware device will be improved, and the software design may impart new applications to the hardware device.

SUMMARY OF THE INVENTION

An object of the present invention is to provide a command conversion interface between a package-information machine and a package-information requestor.

Another object of the present invention is to provide a command conversion interface between an image machine and an image requestor.

A first aspect of the present invention relates to a command conversion interface between an image machine with a plurality of hard keys for providing a digital image information and an image requestor for utilizing the digital image information. The command conversion interface includes a new correlation table established for correlating a designated control key of the image machine with a task, which has not been built in the image machine, to be executed; detection means for determining the activation of the designated control key so as to identify the task to be executed according to the new correlation table; a destination command script file for providing a specific destination command script corresponding to the task to be executed; and a compiler for processing and providing the specific destination command script and the digital image information for the image requestor to execute the task.

Preferably, the designated control key is activated by pressing one of the plurality of hard keys or simultaneously pressing at least two of the plurality of hard keys of the image machine.

Preferably, the designated control key, the task to be executed, and the specific destination command script can be added, cancelled and/or edited via a key control editor, a task control editor, and a command editor, respectively.

The detection means may detect a triggering signal from the designated control key to determine the activation of the designated control key. Alternatively, the detection means may scan the designated control key to determine whether the designated control key is activated.

Preferably, the compiler communicates with the image machine via a driver program.

In an embodiment, the image machine includes an image pickup device, e.g. an image scanner or a digital camera. The image requestor includes an application program capable of executing the task. Alternatively, the image requestor includes a web site in Internet.

A second aspect of the present invention relates to a command conversion interface between a package-information machine with a plurality of hard keys for providing a digital package-information and a package-information requestor for utilizing the digital package-information. The command conversion interface includes a new correlation table for correlating hard keys of the package-information machine with corresponding tasks, which have not been built by said package-information machine; detection means for determining the activation of one of the hard keys so as to find out a task to be executed among the corresponding tasks according to the new correlation table; a destination command script file for providing a specific destination command script corresponding to the task to be executed; and a compiler for processing and providing the specific destination command script and the digital package-information for the package-information requestor to execute the task.

In an embodiment, the digital package-information includes digital image information.

Preferably, the detection means detects a triggering signal from the activated one of the hard keys to find out the task to be executed. Alternatively, the detection means scans the hard keys to determine which one of the hard keys is activated.

Preferably, the compiler communicates with the package-information machine via a driver program.

According to a third aspect of the present invention, the command conversion interface includes a destination command script file for providing a specific destination command script corresponding to a task, which has not been built by the package-information machine, to be executed; and a compiler for receiving the specific destination command script in response to the activation of a designated control key of the package-information machine with a plurality of hard keys to convert and process the specific destination command script and the digital package-information to execute the task.

Preferably, the command conversion interface further includes a new correlation table established for correlating the designated control key of the package-information machine with the task to be executed; and detection means for determining the activation of the designated control key so as to identify the task to be executed according to the new correlation table.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
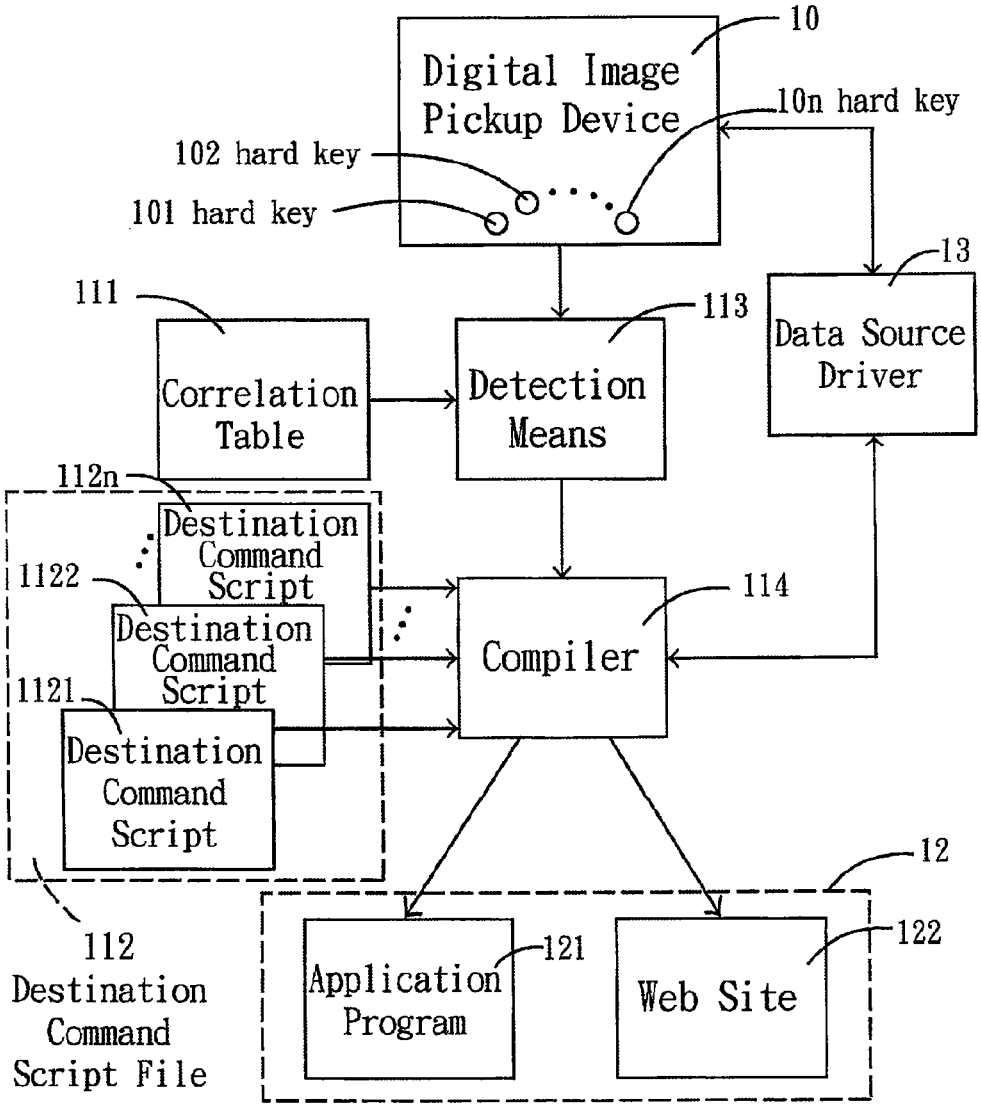
FIG. 1 is a schematic block diagram showing a preferred embodiment of a command conversion interface between an image pickup device and an image requestor according to the present invention.
Figure 2A:
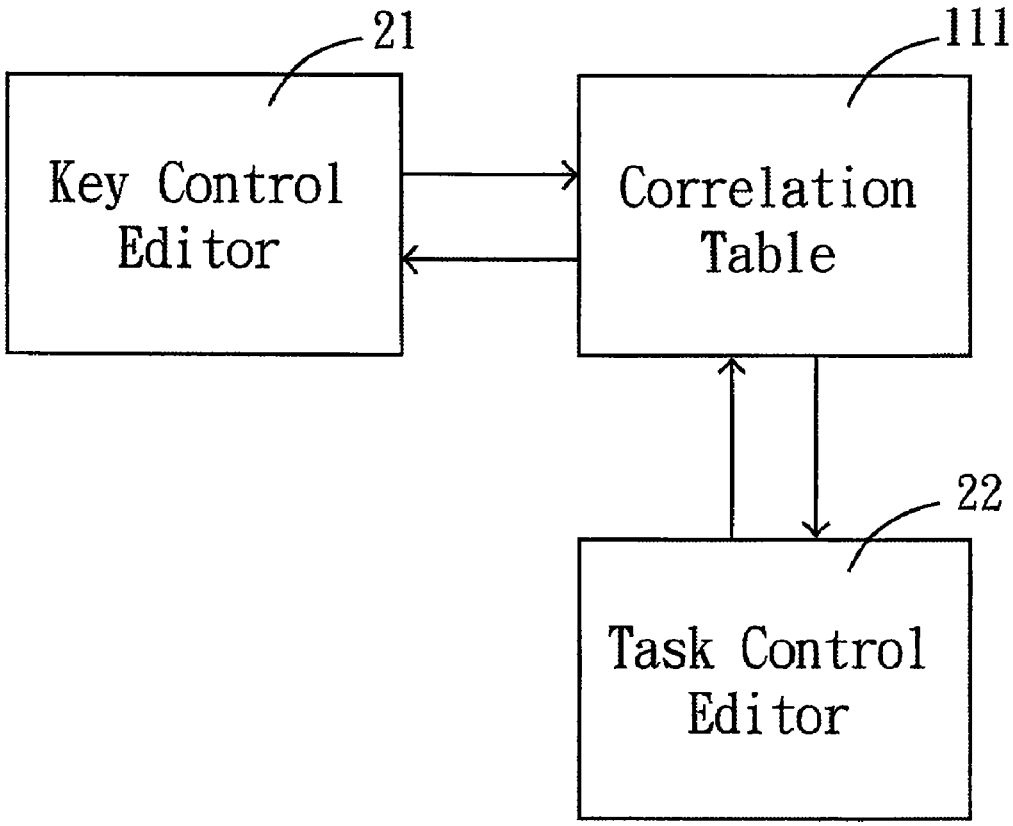
FIG. 2A is a schematic block diagram showing the establishment of the correlation table of FIG. 1.
Figure 2B:
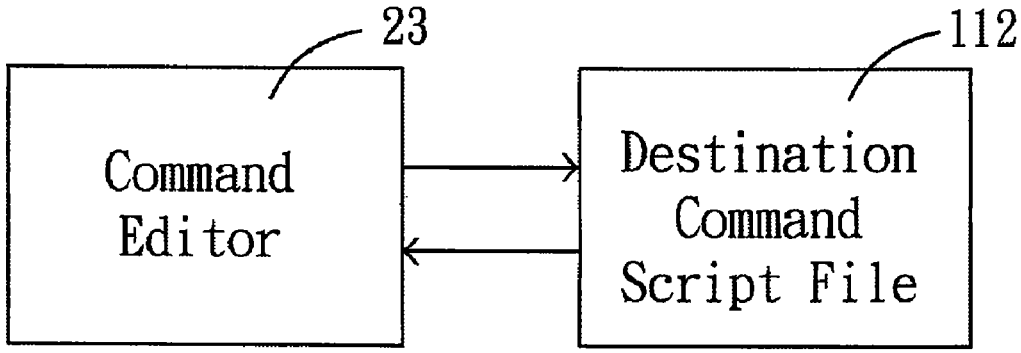
FIG. 2B is a schematic block diagram showing the establishment of the destination command script file.

Please refer to FIG. 1 which is a schematic block diagram showing a preferred embodiment of a command conversion interface between an image pickup device and an image requestor according to the present invention. The command conversion interface includes a correlation table 111, a destination command script file 112 consisting of a plurality of destination command scripts 1121~112n, detection means 113, and a compiler 114. The image pickup device 10 includes a plurality of hard keys 101~10n which are assigned thereto respective tasks via the correlation table 111. The assignment of the hard keys and corresponding tasks is added, cancelled or edited via a key control editor 21 and a task control editor 22 (FIG. 2A). Further, a command editor 23 is used to input the destination command scripts into the destination command script file (FIG. 2B).

When the detection means 113 detects and determines one of the hard keys 101~10n is pressed or actuated in any suitable way, the actuated hard key serves as a control key to specify a task corresponding to the control key according to the correlation table 111. According to the designated task to be executed, a corresponding one of the destination command scripts 1121~112n in the destination command script file 112 is inputted into the compiler 114. Meanwhile, the image pickup device 10 performs an image pickup operation to obtain digital image information of an object, and outputs the digital image information to the compiler 114 via a data source driver 13. The compiler 114 receives the digital image information and the specific destination command script corresponding to the actuated hard key, and converts, processes, and outputs the received information so as to apply the image of the object to an image requester 12. The image requester 12, for example, may include an application program 121 and/or a web site 122 in Internet. It is to be noted that, if necessary, it is also possible to actuate a control key by simultaneously pressing two or more hard keys to perform a function different from that performed by a single hard key.

The image pickup device 10 can be a digital image scanner or a digital camera which picks the image data of an object and converts the image data into digital image information. For example, when the image pickup device is a digital image scanner with at least ten hard keys, ten tasks can be assigned to the ten hard keys, e.g. "Scan-N-Open", "Scan-N-Save", "Quick Copy", "Advanced Copy", "Fax", "E-mail", "OCR-N-Open", "OCR-N-Save", "Activate Software Panel", and "Scan to Web". Preferably, the ten tasks are built in the image scanner, and additional hard keys are reserved to be assigned thereto new tasks by the image requester. The image requestor utilizes the command format required by the command conversion interface to write destination command scripts each corresponding to a designated task.

In this embodiment, the detection means 112 passively detects a triggering signal from one of the control keys to determine the activation of the designated control key. Alternatively, the detection means actively scans all the control keys to determine whether and which control key is activated.

According to the embodiment described above, an example is given as follows to make those skilled in the art understand more about the invention. The image provider is a digital image scanner, the image requestor is a game software program, and a task of "Replace Role's Head" is to be executed. Therefore, first of all, one of the hard keys of the image scanner is assigned thereto a task of "Replace Role's Head" by editing the correlation table (FIG. 2A). The software designer of the game software program then utilizes the command editor to write proper destination command scripts which are acceptable by the compiler to constitute a destination command script file (FIG. 2B). For example, the destination command script file includes scripts of:

Open Application Program;
Execute "Create Game";
Execute "Select"; and
Execute "Replace Head".

When the detection means determines the activation of the control key corresponding to the task of "Replace Role's Head" via the correlation table, the task is outputted to the compiler so that the compiler reads a destination command script corresponding to the task thereinto. Meanwhile, the image scanner scans a photograph to obtain head image information which is also transmitted to the compiler. After the conversion and processing of the compiler, the destination command script and the digital image information are interpreted into executable program codes, and transmitted to the game software program to be executed, i.e. to replace the head of a specified role in the game into the scanned image.

In addition to the application program, the image requestor can also be a web site in the Internet. By using the command conversion interface of the present invention in a similar way as mentioned above, the website designer is allowed to make use of the images obtained by the image scanner easily and conveniently.

From the above description, it is understood that the present invention provides an easy and convenient interface for software and/or website designers to facilitate the integration of information processing device, e.g. information appliance or computer peripheral, and application destination, e.g. application program or web site. Therefore, a series of operations of the information processing device and application destination can be changed or modified as desired by properly defining the hard keys of the information processing device via the present interface. Further, the command conversion interface according to the present invention can be optionally accomplished by software or hardware means.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. [A] *An image machine for providing digital image information, the image machine having a processor, a memory, and a plurality of hard keys, wherein the memory is configured to store non-transitory, computer-readable instructions that, if executed, cause the image machine to execute a* command conversion interface between [an] *the* image machine [with a plurality of hard keys for providing a digital image information] and an image requestor for utilizing [said] *the* digital image information, [and said] *wherein the* command conversion interface [comprising] *comprises*:

a new correlation table established for correlating a designated control key of [said] *the* image machine with a task, which has not been built in [said] *the* image machine, to be executed;

detection means for determining the activation of [said] *the* designated control key [so as] to identify [said] *the* task to be executed according to [said] *the* new correlation table;

a destination command script file for providing a specific destination command script corresponding to [said] *the* task to be executed *according to the new correlation table*; and a compiler for processing and providing [said] *the* specific destination command script and [said] *the* digital image information for [said] *the* image requestor to execute [said] *the* task.

2. The [command conversion interface according to] *image machine of* claim 1 wherein [said] *the* designated control key is *configured to be* activated by pressing one of [said] *the* plurality of hard keys of [said] *the* image machine.

3. The [command conversion interface according to] *image machine of* claim 1 wherein [said] *the* designated control key is *configured to be* activated by simultaneously pressing at least two of [said] *the* plurality of hard keys of [said] *the* image machine.

4. The [command conversion interface according to] *image machine of* claim 1 wherein [said] *the* designated control key and [said] *the* task to be executed are inputted into [said] *the* new correlation table via a key control editor and a task control editor, respectively.

5. The [command conversion interface according to] *image machine of* claim 1 wherein [said] *the* specific destination command script is inputted into [said] *the* destination command script file via a command editor.

6. The [command conversion interface according to] *image machine of* claim 1 wherein [said] *the* detection means detects a triggering signal from [said] *the* designated control key to determine the activation of [said] *the* designated control key.

7. The [command conversion interface according to] *image machine of* claim 1 wherein [said] *the* detection means [scans said] *is configured to scan the* designated control key to determine whether [said] *the* designated control key is activated.

8. The [command conversion interface according to] *image machine of* claim 1 wherein [said] *the* compiler [communicates] *is configured to communicate* with [said] *the* image machine via a driver program.

9. The [command conversion interface according to] *image machine of* claim 1 wherein [said] *the* image machine includes an image pickup device.

10. The [command conversion interface according to] *image machine of* claim 9 wherein [said] *the* image pickup device [is] *comprises* an image scanner.

11. The [command conversion interface according to] *image machine of* claim 9 wherein [said] *the* image pickup device [is] *comprises* a digital camera.

12. The [command conversion interface according to] *image machine of* claim 1 wherein [said] *the* image requestor includes an application program [capable of executing said] *configured to execute the* task.

13. The [command conversion interface according to] *image machine of* claim 12 wherein [said] *the* image requestor includes a web site [in] *on the* Internet.

14. A *package-information requestor for providing digital package-information, the package-information requestor comprising a processor and a memory configured to store non-transitory, computer-readable instructions that, if executed, cause the package-information requestor to execute a* command conversion interface between [a] *the package-information requestor and a* package-information machine [with a plurality of hard keys for providing a digital package-information and a package-information requestor for utilizing said digital package-information, and said] *comprising a plurality of hard keys, wherein the* command conversion interface [comprising] *comprises*:

a new correlation table for correlating [said] *the* plurality of hard keys of [said] *the digital* package-information machine with a plurality of corresponding tasks, which have not been built by [said] *the* package-information machine;

detection means for determining the activation of one of [said] *the* plurality of hard keys [so as] to find out a task to be executed among [said] *the* plurality of corresponding tasks according to [said] *the* new correlation table;

a destination command script file for providing a specific destination command script corresponding to [said] *the* task to be executed; and a compiler for processing and providing [said] *the* specific destination command script and [said] *the* digital package-information for [said] *the* package-information requestor to execute [said] *the* task.

15. The [command conversion interface according to] *package-information requestor of* claim 14 wherein [said] *the* digital package-information includes digital image information.

16. The [command conversion interface according to] *package-information requestor of* claim 14 wherein [said] *the* detection means [detects] *is configured to detect* a triggering signal from [said] *the* activated one of [said] *the* plurality of hard keys to find out [said] *the* task to be executed.

17. The [command conversion interface according to] *package-information requestor of* claim 14 wherein [said] *the* detection means [scans said] *is configured to scan the* plurality of hard keys to determine which one of [said] *the* plurality of hard keys is activated.

18. The [command conversion interface according to] *package-information requestor of* claim 14 wherein [said] *the* compiler [communicates] *is configured to communicate* with [said] *the* package-information machine via a driver program.

19. A *package-information requestor comprising a processor and memory containing a non-transitory computer-readable medium that, if executed, causes the package-information requestor to provide a* command conversion interface between a package-information machine with a plurality of hard keys [for providing a digital package-information] and [a] *the* package-information requestor for utilizing [said] *a* digital package-information, [and said] *wherein the* command conversion interface [comprising] *comprises*:

a destination command script file for providing a specific destination command script corresponding to a task, which has not been built by [said] *the* package-information machine, to be executed; and a compiler for receiving [said] *the* specific destination command script in response to the activation of a designated control key of [said] *the* package-information machine to convert and process [said] *the* specific destination command script and [said] *the* digital package-information to execute [said] *the* task;

a new correlation table established for correlating [said] *the* designated control key of [said] *the* package-information machine with [said] *the* task to be executed; and detection means for determining the activation of [said] *the* designated control key so as to identify [said] *the* task to be executed according to [said] *the* new correlation table.

20. The [command conversion interface according to] *package-information requestor of* claim 19 wherein [said] *the* detection means [detects] *is configured to detect* a triggering signal from [said] *the* designated control key to determine the activation of [said] *the* designated control key.

21. The [command conversion interface according to] *package-information requestor of* claim 19 wherein [said] *the* detection means [scans said] *is configured to scan the* designated control key to determine whether [said] *the* designated control key is activated.

*22. In a system comprising an image device having a plurality of hard control keys for providing digital image information, an image requestor for receiving the digital image information, and a command conversion interface between the image device and the image requestor, a method comprising:*

*receiving a new correlation table including a designated hard control key of the image device correlated with a task to be executed according to the new correlation table, wherein the task has not been built in to the image device;*

*determining activation of the designated hard control key and identifying the task to be executed, wherein the task to be executed is different than a task associated with the designated hard control key if the image device is not connected to the image requestor through the command conversion interface;*

*compiling and processing a destination command script corresponding to the task to be executed and the digital image information; and*

*providing the processed digital image information to the image requestor.*

*23. The system of claim 22 wherein determining activation of the designated control key comprises detecting a signal from one or more of the control keys.*

*24. The system of claim 22 wherein correlating a designated control key with a task to be executed comprises assigning specific tasks to specific control keys and storing the assignment data in a correlation table.*

*25. The system of claim 22 wherein providing the processed digital image information to the image requestor comprises providing the processed digital information to an application program.*

*26. The system of claim 22 wherein providing the processed digital image information to the image requestor comprises providing the processed digital information to a Web site via the Internet.*

*27. The system of claim 22, further comprising generating one or more destination command script files corresponding to one or more tasks to be executed before correlating a designated control key of the image device with a task.*

*28. A package information machine comprising a non-transitory computer-readable medium having instructions stored thereon that, if executed by the package information machine, cause the package information machine to perform operations for supplementing capabilities of the package information machine, the operations comprising:*

*gathering image information in the package information machine, wherein the package information machine comprises a plurality of hard keys and is configured to perform a first group of tasks on the image information;*

*activating a new correlation table upon connection to a package information requestor;*

*generating a signal by detecting a depression of at least one of the plurality of hard keys, the signal being correlated in the new correlation table to at least one task included in a second group of tasks, wherein the second group of tasks is unavailable when the new correlation table is not activated; and*

*sending the signal to a package information requestor, wherein the package information requestor is configured to perform the second group of tasks according to the new correlation table.*

*29. The package information machine of claim 28 wherein gathering image information in the package information machine comprises gathering image information in at least one of a digital camera or an image scanner.*

*30. The package information machine of claim 28 wherein at least a portion of the tasks in the second group of tasks are not included in the first group of tasks.*

*31. The package information machine of claim 28 wherein generating a signal by detecting a depression comprises detecting at least one of the following: a single hard key depression, a plurality of hard keys depressed simultaneously, and a plurality of hardkeys depressed serially.*

*32. The package information machine of claim 28 wherein the package information requestor comprises a web site.*

*33. The package information machine of claim 28 wherein the second group of tasks comprises at least one of: scan and open, scan and save, quick copy, advanced copy, fax, e-mail, optical character recognition and open, optical character recognition and save, activate software panel, and scan to web.*

*34. A non-transitory computer-readable storage medium having stored thereon, computer-executable instructions that, if executed by a computing device, cause the computing device to perform operations comprising:*

*capturing an image in an image pickup device;*

*receiving a signal that indicates a depression of at least one hard key on the image pickup device;*

*correlating in a new correlation table the depression to at least one of a plurality of destination command scripts upon connecting the image pickup device to an image requestor, each destination command script describing at least one task, wherein the task is a first task different from a second task associated with the depression if the image pickup device is not connected to the image requestor;*

*transferring the image from the image pickup device to the image requestor; and*

*performing at least one task described by a destination command script of the plurality of destination scripts correlated to the depression.*

*35. The non-transitory computer-readable storage medium of claim 34 wherein the image comprises an image of a head, and wherein the at least one task comprises substituting the image of a head into a game software program to replace at least one character's head in the game software program.*

* * * * *